US012105930B2

(12) United States Patent
Harrison et al.

(10) Patent No.: US 12,105,930 B2
(45) Date of Patent: *Oct. 1, 2024

(54) INTERACTIVE MESSAGING STICKERS

(71) Applicant: Snap Inc., Santa Monica, CA (US)

(72) Inventors: Shaun Harrison, Oakdale, CA (US); Christie Marie Heikkinen, Santa Monica, CA (US); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,828

(22) Filed: Oct. 19, 2021

(65) Prior Publication Data

US 2022/0035495 A1 Feb. 3, 2022

Related U.S. Application Data

(63) Continuation of application No. 16/836,692, filed on Mar. 31, 2020, now Pat. No. 11,182,055.

(51) Int. Cl.
*G06F 3/0482* (2013.01)
(52) U.S. Cl.
CPC ................. *G06F 3/0482* (2013.01)
(58) Field of Classification Search
CPC .... G06F 3/0482; G06F 3/04817; G06F 9/451; H04L 51/52; H04L 51/1032; H04L 51/10
See application file for complete search history.

(56) References Cited

U.S. PATENT DOCUMENTS

| 8,713,459 | B2 * | 4/2014 | Yanchar | G06F 40/134 715/834 |
| 8,896,556 | B2 * | 11/2014 | Frazier | G06F 3/04886 345/173 |
| 9,495,692 | B2 | 11/2016 | Tung et al. | |
| 10,579,969 | B2 * | 3/2020 | Johnson | G06Q 10/107 |
| 10,623,917 | B1 | 4/2020 | Paul | |
| 11,025,582 | B1 | 6/2021 | Paul | |
| 11,068,137 | B2 * | 7/2021 | Dalonzo | G11B 27/00 |
| 11,182,055 | B2 | 11/2021 | Harrison et al. | |
| 2007/0101296 | A1 | 5/2007 | Won et al. | |

(Continued)

FOREIGN PATENT DOCUMENTS

| CN | 115698924 A | 2/2023 |
| WO | WO-2021202386 A1 | 10/2021 |

OTHER PUBLICATIONS

"U.S. Appl. No. 16/836,692, Final Office Action mailed Dec. 17, 2020", 16 pgs.

(Continued)

*Primary Examiner* — Mahelet Shiberou
(74) *Attorney, Agent, or Firm* — Schwegman Lundberg & Woessner, P.A.

(57) ABSTRACT

An interactive sticker system to perform operations that include: causing display of a presentation of media at a client device, the presentation of the media including a display of an icon within the presentation of the media; receiving an input that selects the icon from the client device, the input comprising an input attribute; generating a menu element based on the icon and the input attribute in response to the input that selects the icon; and presenting the menu element at a position within the presentation of the media at the client device.

11 Claims, 12 Drawing Sheets

(56) References Cited

U.S. PATENT DOCUMENTS

| | | | |
|---|---|---|---|
| 2009/0036220 A1* | 2/2009 | Nagashima | A63F 13/00 463/16 |
| 2010/0026526 A1 | 2/2010 | Yokota | |
| 2010/0070877 A1 | 3/2010 | Scott et al. | |
| 2011/0161875 A1 | 6/2011 | Kankainen | |
| 2013/0080922 A1* | 3/2013 | Elias | G06Q 10/1095 715/753 |
| 2013/0159431 A1 | 6/2013 | Berry et al. | |
| 2013/0339868 A1 | 12/2013 | Sharpe et al. | |
| 2015/0193740 A1* | 7/2015 | Nudel | H04L 51/18 705/7.19 |
| 2015/0347534 A1* | 12/2015 | Gross | H04L 51/046 707/722 |
| 2016/0085863 A1 | 3/2016 | Allen et al. | |
| 2016/0196052 A1* | 7/2016 | Franklin | G06F 3/0481 715/765 |
| 2016/0210467 A1 | 7/2016 | Mehrab et al. | |
| 2016/0334949 A1* | 11/2016 | Sergott | G09G 5/34 |
| 2016/0334972 A1 | 11/2016 | Cheng et al. | |
| 2017/0192651 A1 | 7/2017 | Yang et al. | |
| 2017/0264578 A1* | 9/2017 | Allen | H04L 12/1859 |
| 2018/0095606 A1 | 4/2018 | Chae et al. | |
| 2018/0234371 A1 | 8/2018 | Lande et al. | |
| 2019/0050115 A1 | 2/2019 | Krishna et al. | |
| 2019/0187880 A1 | 6/2019 | Dalonzo | |
| 2019/0273652 A1 | 9/2019 | Pai et al. | |
| 2021/0142350 A1 | 5/2021 | Vakorin et al. | |
| 2021/0303112 A1 | 9/2021 | Harrison et al. | |

OTHER PUBLICATIONS

"U.S. Appl. No. 16/836,692, Non Final Office Action mailed Mar. 18, 2021", 16 pgs.

"U.S. Appl. No. 16/836,692, Non Final Office Action mailed Sep. 17, 2020", 14 pgs.

"U.S. Appl. No. 16/836,692, Notice of Allowance mailed Jul. 16, 2021", 7 pgs.

"U.S. Appl. No. 16/836,692, Response filed Feb. 17, 2021 to Final Office Action mailed Dec. 17, 2020", 10 pgs.

"U.S. Appl. No. 16/836,692, Response filed Apr. 20, 2021 to Non Final Office Action mailed Mar. 18, 2021", 12 pgs.

"U.S. Appl. No. 16/836,692, Response filed Oct. 12, 2020 to Non Final Office Action mailed Sep. 17, 2020", 11 pgs.

"International Application Serial No. PCT/US2021/024662, International Search Report mailed Jul. 20, 2021", 3 pgs.

"International Application Serial No. PCT/US2021/024662, Written Opinion mailed Jul. 20, 2021", 5 pgs.

Brooks, Aaron, "How to Make Best Use of Instagram Stories Stickers for Marketing", Social Media Today, [Online] Retrieved from the Internet: <URL: https://www.socialmediatoday.com/news/how-to-make-best-use-of-instagram-stories-stickers-for-marketing/547862/>, (Feb. 7, 2019), 12 pgs.

"U.S. Appl. No. 16/836,692, Corrected Notice of Allowability mailed Oct. 26, 2021", 3 pgs.

"International Application Serial No. PCT/US2021/024662, International Preliminary Report on Patentability mailed Oct. 13, 2022", 7 pgs.

"European Application Serial No. 21780293.3, Extended European Search Report mailed Nov. 8, 2023", 5 pgs.

\* cited by examiner

700

RECEIVING AN INPUT THAT SELECTS THE ICON FROM A FIRST CLIENT DEVICE
702

IDENTIFYING A SECOND CLIENT DEVICE WITHIN A THRESHOLD DISTANCE OF A LOCATION ASSOCIATED WITH THE ICON IN RESPONSE TO THE INPUT
704

GENERATING A MENU ELEMENT IN RESPONSE TO THE IDENTIFYING THE SECOND CLIENT DEVICE WITHIN THE THRESHOLD DISTANCE OF THE LOCATION, THE MENU ELEMENT INCLUDING AN IDENTIFIER ASSOCIATED WITH THE SECOND CLIENT DEVICE
706

*FIG. 7*

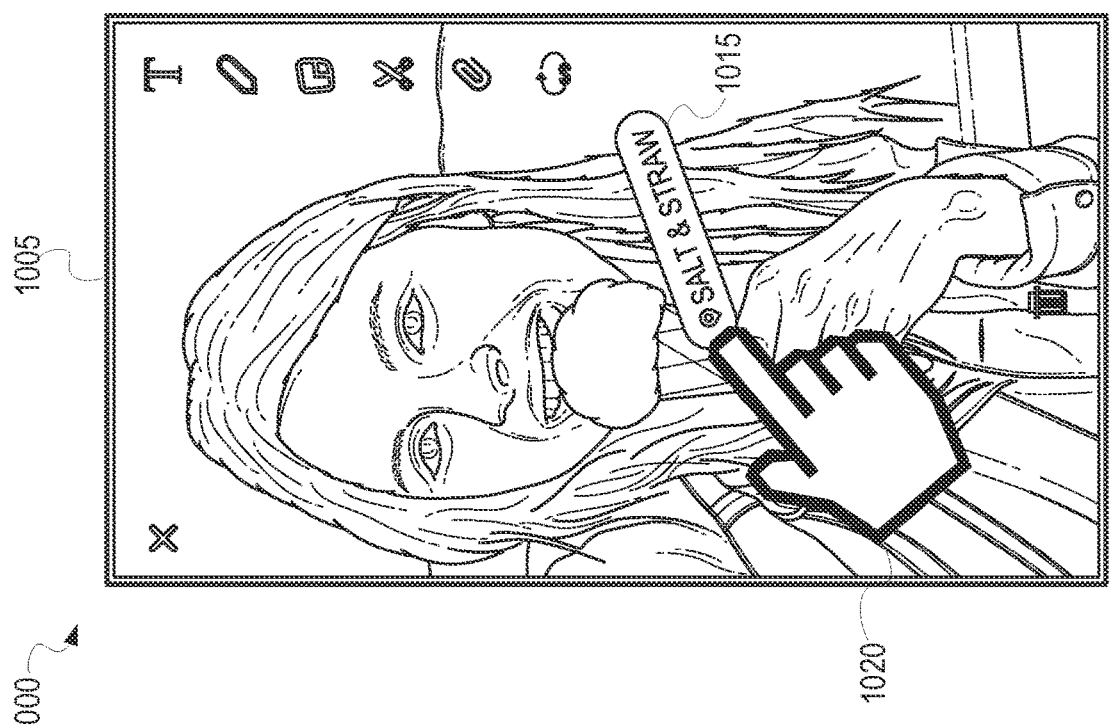
FIG. 10

INTERACTIVE MESSAGING STICKERS

CLAIM OF PRIORITY

This application is a continuation of U.S. patent application Ser. No. 16/836,692, filed on Mar. 31, 2020, which is hereby incorporated by reference herein in its entirety.

TECHNICAL FIELD

Embodiments of the present disclosure relate generally to mobile computing technology and, more particularly, but not by way of limitation, to systems for presenting interactive graphical icons.

BACKGROUND

Social messaging applications are platforms that enable the sharing and distribution of various forms of media content. Users of social messaging applications may send and receive messages that include multimedia to one another, wherein the multimedia may include images, videos, or other content.

One aspect of social messaging applications which have grown in popularity are "stickers." A sticker is an illustration, or graphical icon, which may be placed or added at a user-defined position within a message. In its simplest form, it may be described as an emoticon, developed to add more depth and breadth of expression than what is possible with traditional punctuation or message content.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 is a flowchart depicting a method of presenting a menu element based on an input that selects an interactive sticker, according to certain example embodiments.

FIG. 10 is an interface flow-diagram depicting interfaces presented by the interactive sticker system, according to certain example embodiments.

DETAILED DESCRIPTION

Figure 1:
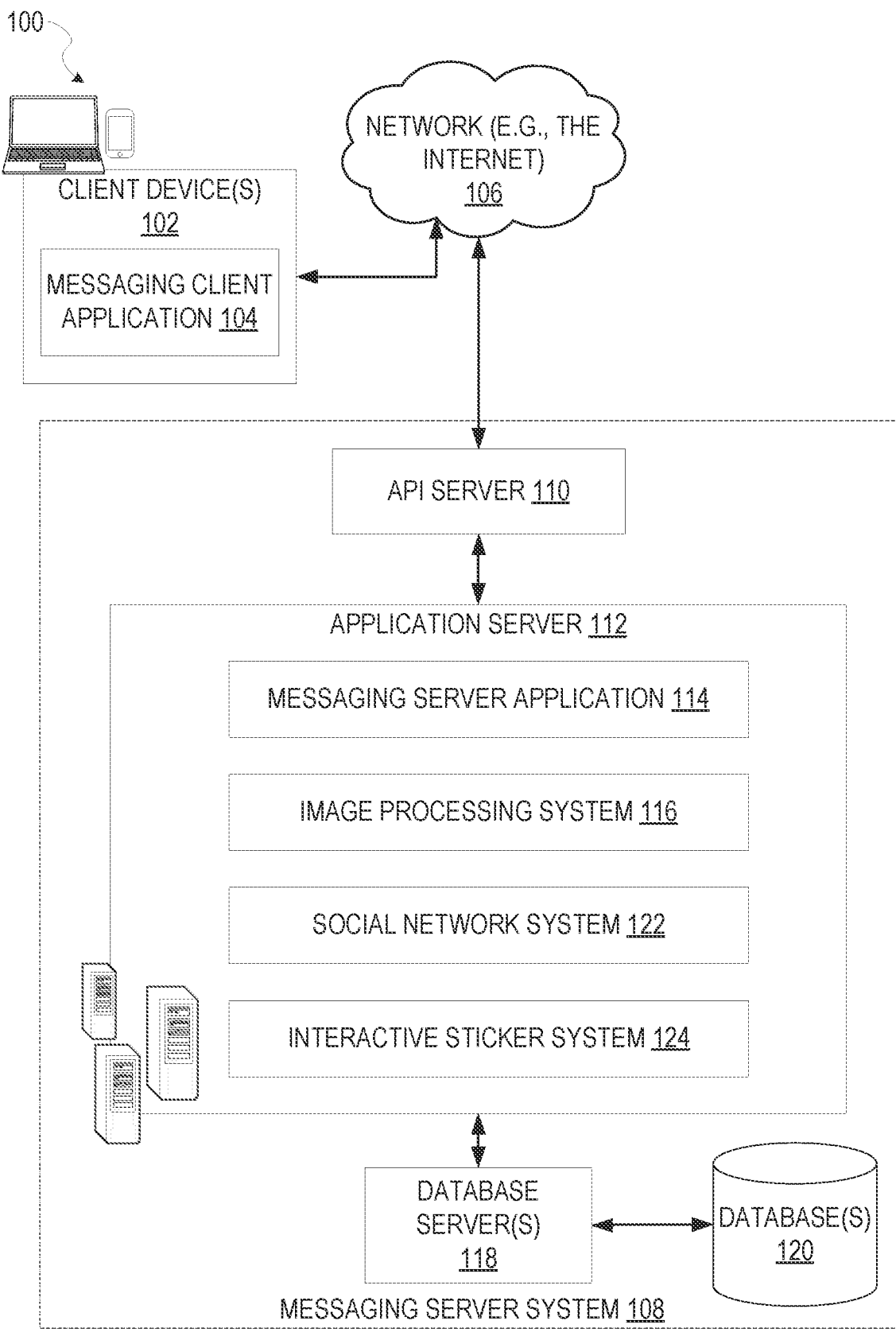
FIG. 1 is a block diagram showing an example messaging system for exchanging data (e.g., messages and associated content) over a network in accordance with some embodiments, wherein the messaging system includes an interactive sticker system.

As discussed above, in the context of social messaging applications, a sticker is an illustration, or graphical icon, which may be placed or added at a user-defined position within contents of a message. Users of such social messaging applications may add more depth and breadth of expression to their message through the selection and placement of stickers, than what was previously possible through traditional messaging applications. Accordingly, the disclosed system further enhances a user's ability to convey expression through messages, by generating and presenting interactive stickers, wherein the interactive stickers may receive inputs to present content based on contextual factors.

In certain example embodiments, a sticker comprises a graphical icon, and corresponding data objects. For example, a sticker may reference a user account, a location, a group, an event, as well as a topic (i.e., a hashtag), and may also include interactive elements, such as a poll (i.e., a radio selection), a multiple choice question or request, or a true or false question or request. A user may apply a sticker to a message or contents of a message (i.e., media), which may then be received and displayed at a client device. A user of the client device may thereby provide inputs (i.e., tactile inputs) that select the sticker. Responsive to such inputs, further content associated with the sticker may be presented at the client device.

Accordingly, an interactive sticker system is disclosed which performs operations that include: causing display of a presentation of media at a client device, the presentation of the media including a display of an icon within the presentation of the media; receiving an input that selects the icon from the client device, the input comprising an input attribute; generating a menu element based on the icon and the input attribute in response to the input that selects the icon; and presenting the menu element at a position within the presentation of the media at the client device.

In certain example embodiments, the client device may be associated with a user profile that comprises user profile data. For example, user profile data may include a list of user connections (i.e., buddy list), user preferences, user demographics information, a log of user activities performed by the user, user interaction data that indicates bi-directional communications which the user may engage in, location data, as well as explicit and implicit user affinities.

In such embodiments, the interactive sticker system may generate the menu element based on the user profile data associated with the user account, and attributes of the sticker. For example, the sticker may reference a user account (i.e., a username). Responsive to receiving an input from a first user that selects the sticker, the interactive icon system may determine a relationship between the first user and a second user account identified by the sticker. The relationship may include a bidirectional relationship (i.e., the first user and the second user are linked in a social network), a one-way connection (i.e., the first user is linked with the second user in the social network), or an indication that a bidirectional connection of the first user is bidirectionally linked with the second user. The interactive sticker system may thereby present a menu element that comprises one or more menu options based on the relationship.

In certain example embodiments, the interactive sticker may correspond with a location or location of interest. For example, the sticker may comprise a reference to a location of interest. Responsive to receiving an input that selects the sticker, the interactive sticker system may present a menu element that includes content related to the location. For example, in some embodiments, the interactive sticker system may identify one or more client devices within a threshold distance of the location of interest, and may present identifies associated with the one or more client devices within the menu element.

In some embodiments, responsive to receiving a selection of the sticker, the interactive sticker system may access location data at the client device in order to determine a location of the client device. Responsive to determining that the client device is within a threshold distance of the location that corresponds with the sticker, the interactive sticker system may present content related to the location within a menu element.

In some embodiments, the interactive sticker may include an identification of an event, wherein the event comprises a location and a time. Responsive to receiving a selection of the sticker, the interactive sticker system may present a menu element that comprises a display of the location and time of the event, along with one or more selectable options. A user of the client device may thereby provide an input selecting an option from among the one or more selectable options in order to add the event to a calendar associated with a user profile of the user.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an interactive sticker system 124. The interactive sticker system 124 is configured to generate and cause display of interactive stickers within media content displayed at a client device 102, according to certain example embodiments. Further details of the Interactive sticker system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
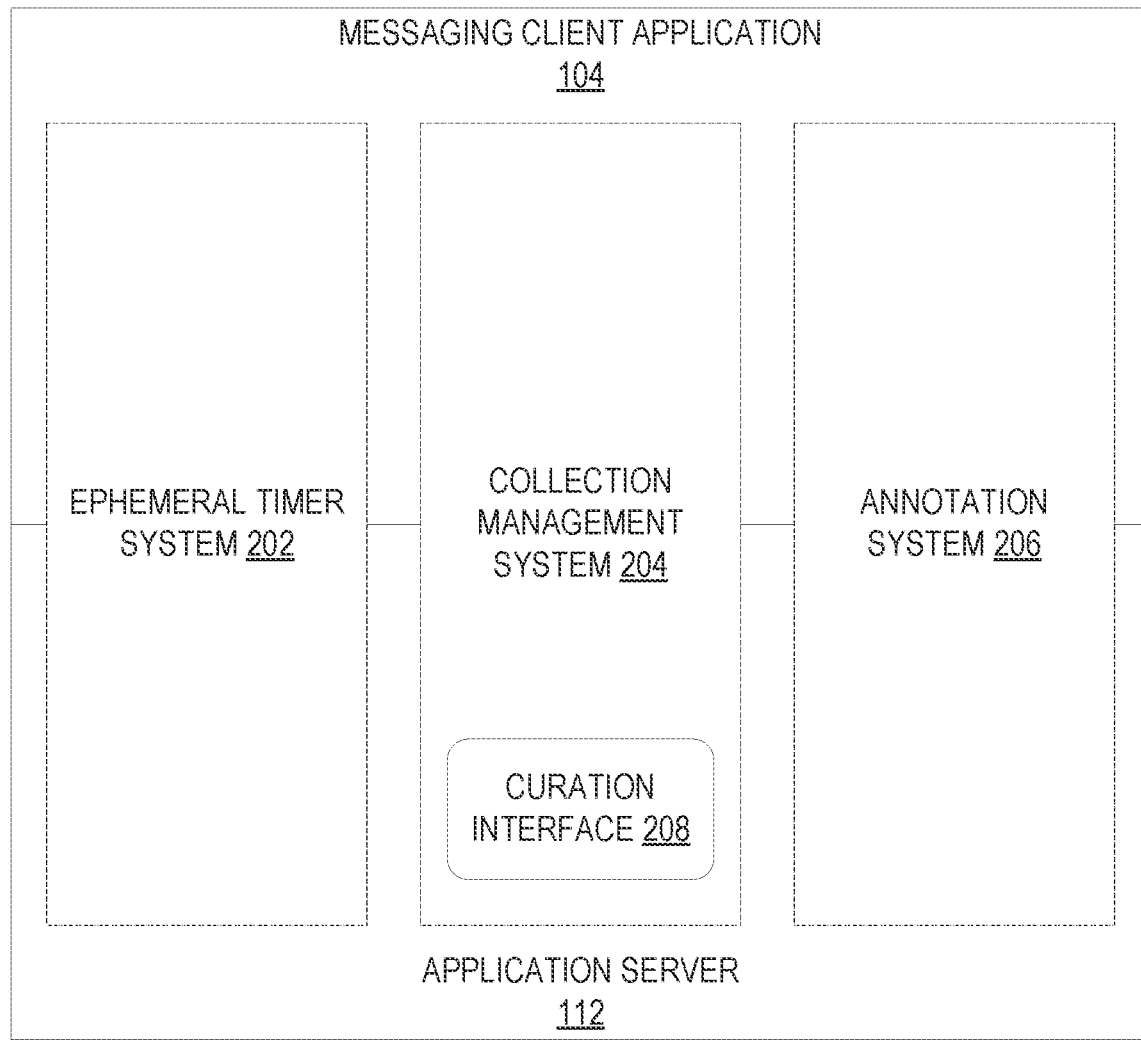
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a collection of media), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter, lens) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models. An example of a visual effect includes color overlaying. The audio and visual content or the visual effects can be applied to a media content item (e.g., a photo or video) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
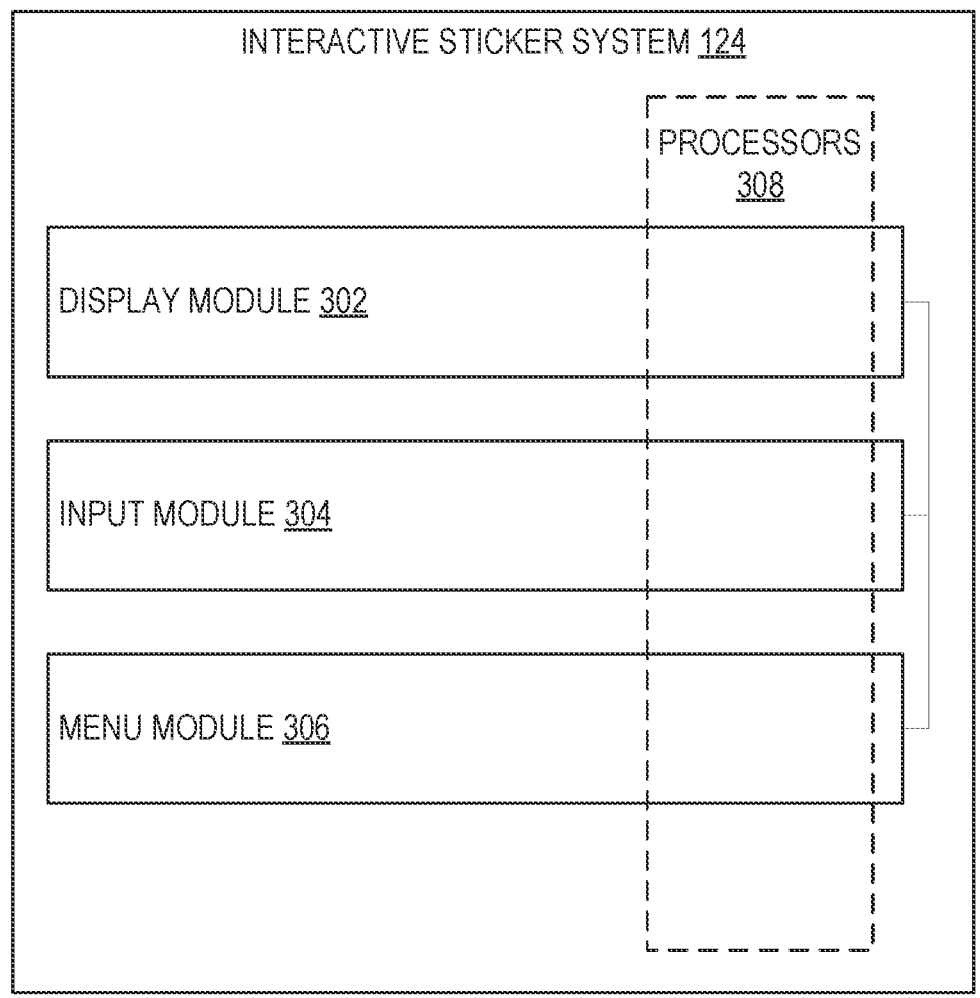
FIG. 3 is a block diagram illustrating various modules of an interactive sticker system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the interactive sticker system 124 that configure the interactive sticker system 124 to perform operations to generate and cause display of an interactive sticker at a client device 102, according to certain example embodiments.

The interactive sticker system 124 is shown as including a display module 302, an input module 304, and a menu module 306, all configured to communicate with each other (e.g., via a bus, shared memory, or a switch). Any one or more of these modules may be implemented using one or more processors 308 (e.g., by configuring such one or more processors to perform functions described for that module) and hence may include one or more of the processors 308. In certain embodiments, the interactive sticker system 124 may include or have access to the database 120, wherein the database 120 may comprise a collection of media content indexed based on user attributes and astrological signs.

Any one or more of the modules described may be implemented using hardware alone (e.g., one or more of the processors 308 of a machine) or a combination of hardware and software. For example, any module described of the interactive sticker system 124 may physically include an arrangement of one or more of the processors 308 (e.g., a subset of or among the one or more processors of the machine) configured to perform the operations described herein for that module. As another example, any module of the interactive sticker system 124 may include software, hardware, or both, that configure an arrangement of one or more processors 308 (e.g., among the one or more processors of the machine) to perform the operations described herein for that module. Accordingly, different modules of the interactive sticker system 124 may include and configure different arrangements of such processors 308 or a single arrangement of such processors 308 at different points in time. Moreover, any two or more modules of the interactive sticker system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
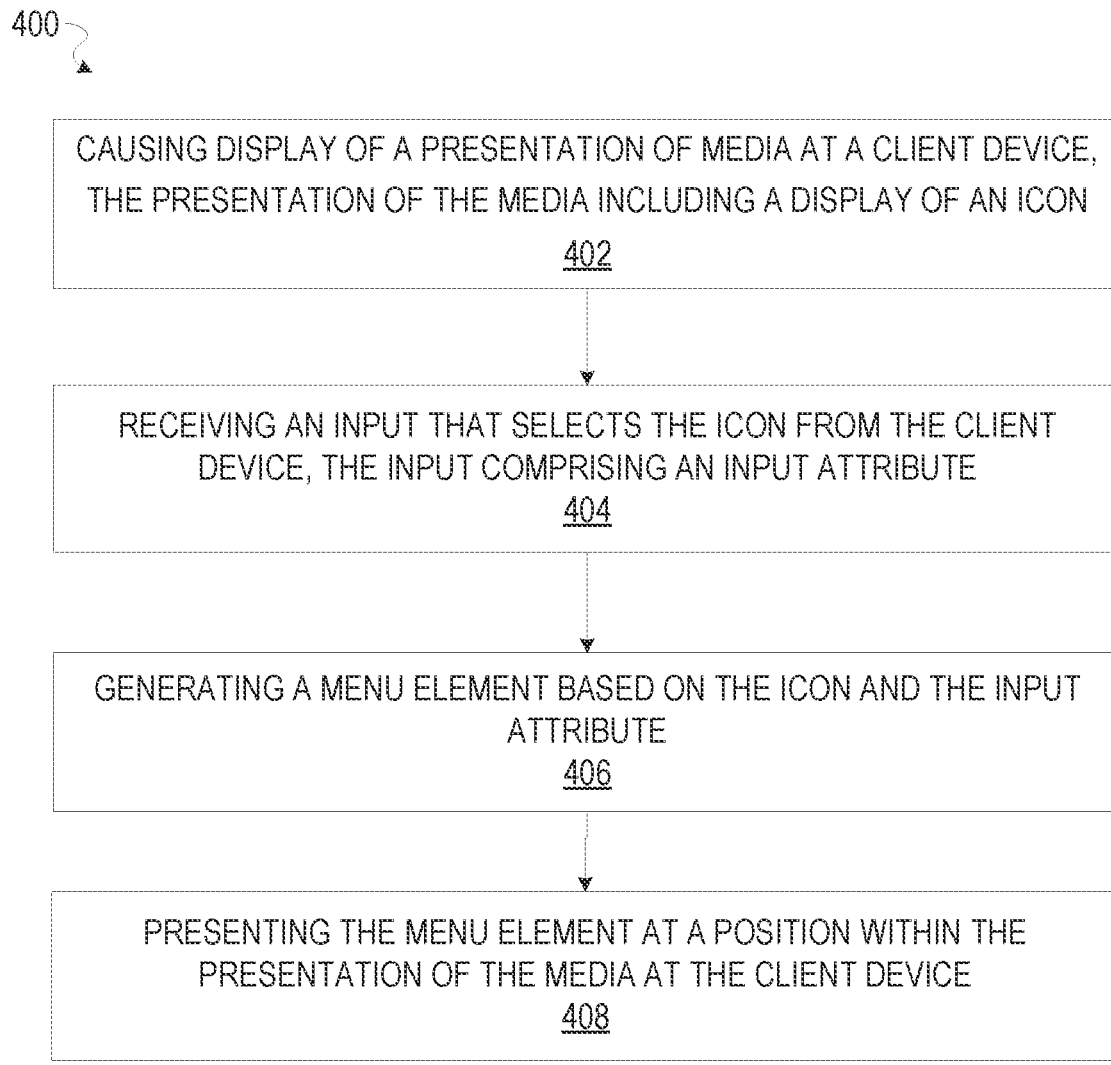
FIG. 4 is a flowchart depicting a method of presenting a menu element based on an input that selects an interactive sticker, according to certain example embodiments.

FIG. 4 is a flowchart depicting a method 400 presenting a menu element based on an input that selects an interactive sticker, according to certain example embodiments. Operations of the method 400 may be performed by the modules described above with respect to FIG. 3. As shown in FIG. 4, the method 400 includes one or more operations 402, 404, 406, and 408.

At operation 402, the display module 302 generates and causes display of media at a client device 102. For example, the media may include contents of a message received at the client device 102, wherein the media from the message includes a display of an icon at a position upon the media. According to certain example embodiments, the icon may include an interactive sticker, as discussed above, wherein a position and attributes of the interactive sticker within the media may be defined based on a user input. Attributes of the interactive sticker may include graphical properties of the interactive sticker, as well as interactive features of the interactive sticker.

At operation 404, the input module 304 receives an input at the client device 102, wherein the input selects the icon. According to certain example embodiments, the input may comprise input attributes, wherein the input attributes include an input pressure and an input duration. For example, a user of the client device 102 may provide a tactile input at a position upon a display of the client device 102 which corresponds with the position of the icon within the media.

Figure 9:
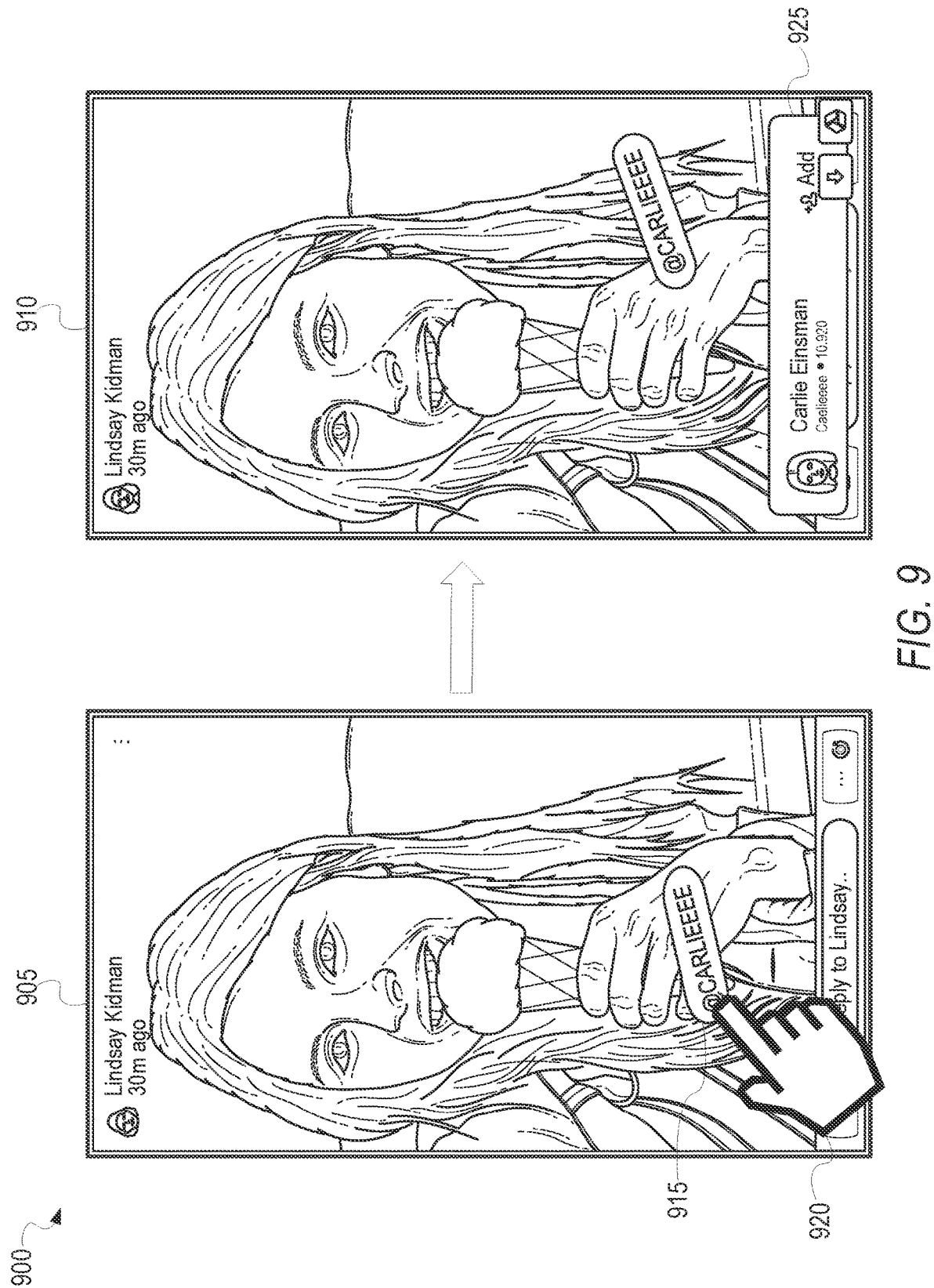
FIG. 9 is an interface flow-diagram depicting interfaces presented by the interactive sticker system, according to certain example embodiments.

At operation 406, the menu module 306 generates a menu element that comprises a set of menu options responsive to the input, and based on attributes of the icon, input attributes of the input, and in some embodiments user attributes of a user associated with the client device 102. At operation 408, the menu module 306 causes display of a presentation of the menu element at a position within the presentation of the media at the client device 102. Illustrative examples of menu elements are depicted in FIGS. 9 and 10, such as the menu element 925 depicted in FIG. 9, and the menu element 1025 depicted in FIG. 10.

Figure 5:
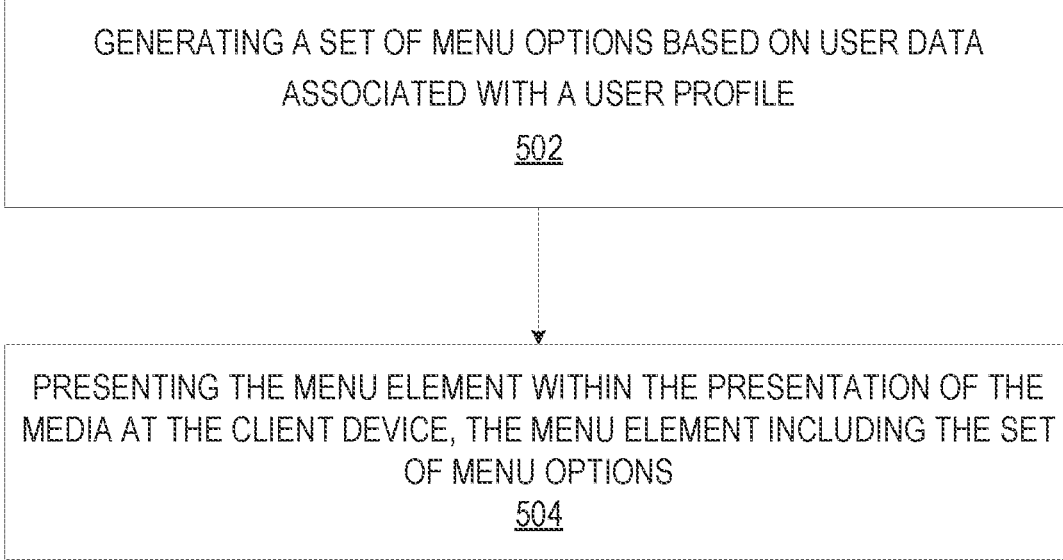
FIG. 5 is a flowchart depicting a method of presenting a menu element based on an input that selects an interactive sticker, according to certain example embodiments.

FIG. 5 is a flowchart depicting a method 500 of presenting a menu element based on an input that selects an interactive sticker, according to certain example embodiments. Operations of the method 500 may be performed by the modules described above with respect to FIG. 3. As shown in FIG. 5, the method 500 includes one or more operations 502, and 504, that may be performed as a part (i.e., a subroutine) of operations 406 and 408 of the method 400.

At operation 502, responsive to the input module 304 receiving the input that selects the icon (i.e., the interactive sticker), the menu module 306 generates a set of menu options based on user data associated with the user profile of the client device 102. For example, the user data may include a set of user connections of the user, user preferences (i.e., language preferences), user affinities (likes and follows), as well as user demographics data.

According to certain example embodiments, the menu module 306 may access a database 120, wherein the database 120 comprises a collection of menu options, wherein each menu option among the set of menu options may correspond with user data. For example, a first set of menu options may correspond with a first user attribute, while a second set of menu options may correspond with a second user attribute.

In some embodiments, the set of menu options may be presented based on user data indicating a relationship between a first user (i.e., a user of the client device 102), and an account, such as an account of a second user, or location identified by the icon. For example, the icon may include a display of an identifier of an account, such as a user account or an account that corresponds with a location of interest (i.e., a business account). Responsive to receiving the input that selects the icon, the menu module 306 accesses user data associated with the client device 102 in order to determine a relationship between the user and the account identified by the icon. The relationship may include a bidirectional relationship (i.e., a first user and a second user are network connections), the first user follows or has expressed an affinity toward the account, or that the first user has visited the location, or is currently at the location identified by the account.

At operation 504, the display module 302 causes display of a presentation of the menu element within the presentation of the media at the client device 102, wherein the menu element includes the set of menu options generated by the menu module 306 based on the user data associated with the client device 102. Illustrative examples of menu elements are depicted in FIGS. 9 and 10, such as the menu element 925 depicted in FIG. 9, and the menu element 1025 depicted in FIG. 10.

For example, as seen in the menu element 925 depicted in the interface diagram 900 of FIG. 9, the menu element 925 may comprise a display of a user action which may be performed by a user of the client device 102, wherein the user action may have been selected based on a relationship between the user of the client device 102 and the user account identified by the interactive sticker 915.

Figure 6:
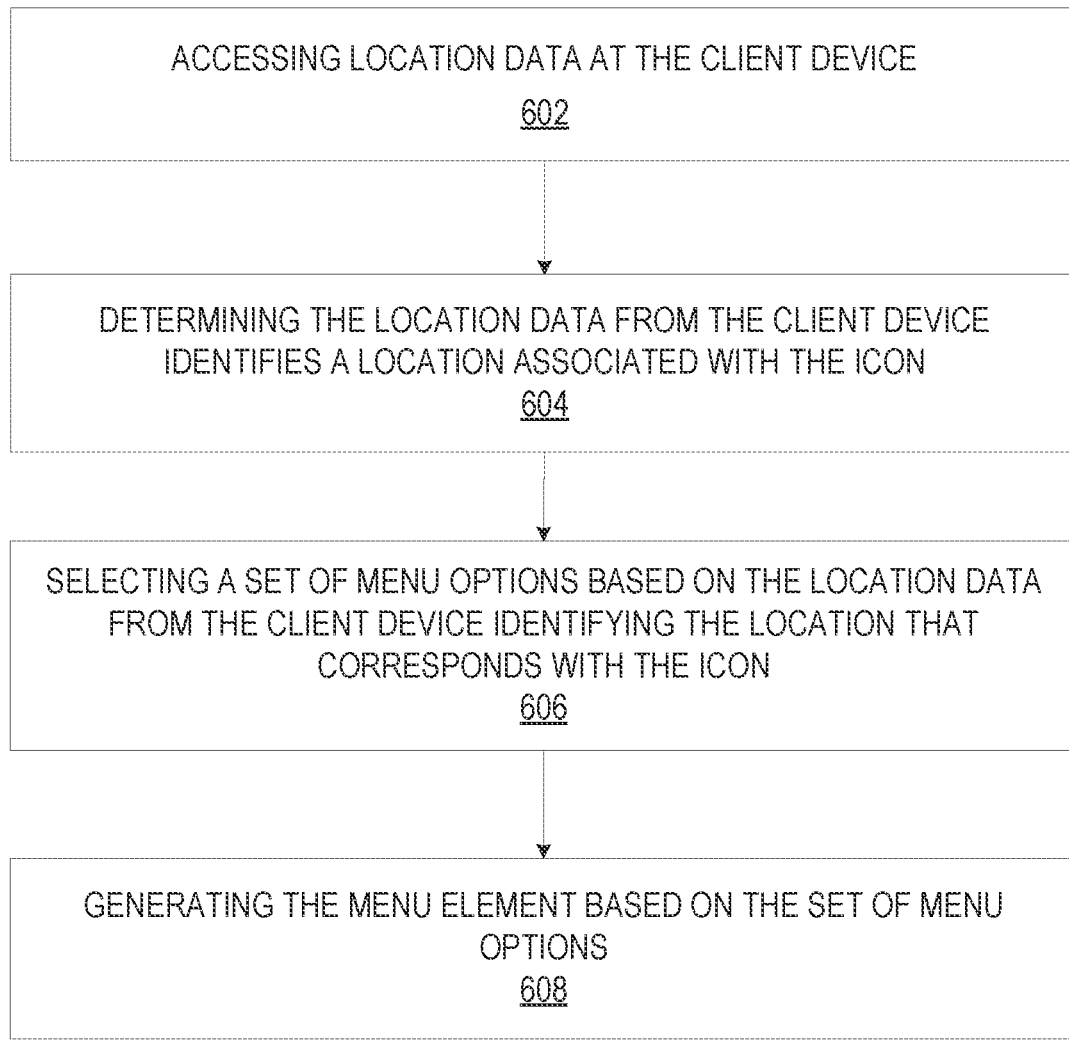
FIG. 6 is a flowchart depicting a method of presenting a menu element based on an input that selects an interactive sticker, according to certain example embodiments.

FIG. 6 is a flowchart depicting a method 600 of presenting a menu element based on an input, according to certain example embodiments. Operations of the method 600 may be performed by the modules described above with respect to FIG. 3. As shown in FIG. 6, the method 600 includes one or more operations 602, 604, 606 and 608, and may be performed as a part of operations 406 and 408 of the method 400.

At operation 602, the menu module 306 accesses location data at the client device 102, wherein the location data identifies a current location of the client device 102. In some embodiments, the menu module 306 may access the location data responsive to detecting the display of the media that includes the presentation of the icon (i.e., the interactive sticker) at the client device 102. In further embodiments, the menu module 306 may access the location data responsive to the input module 304 receiving the input that selects the icon at the client device 102.

At operation 604, the menu module 306 determines that the location data from the client device 102 identifies a location associated with the icon. For example, the icon may comprise an identifier that identifies a location of interest.

At operation 606, the menu module 306 selects a set of menu options from a collection of menu options based on the location data from the client device identifying the location associated with the icon. For example, in such embodiments, the set of menu options may only be presented to users that are at a particular location that corresponds with the icon. At operation 608, the menu module 306 generates the menu element based on the selected set of menu options.

FIG. 7 is a flowchart depicting a method 700 of presenting a menu element based on an input, according to certain example embodiments. Operations of the method 700 may be performed by the modules described above with respect to FIG. 3. As shown in FIG. 7, the method 700 includes one or more operations 702, 704, and 706, and may be performed as a part of operations 406 and 408 of the method 400.

At operation 702, as in operation 404 of the method 400, the input module 304 receives an input that selects an icon (i.e., an interactive sticker) from a presentation of media at a client device 102 (i.e., a first client device).

At operation 704, responsive to receiving the input that selects the icon, the input module 304 identifies a second client device within a threshold distance of a location associated with the icon. For example, in certain embodiments, the second client device 102 may correspond with a second user account which may be linked to a first user account associated with the first client device 102 (i.e., as a social network connection). For example, the input module 304 may identify client devices associated with network connections of the first user account.

At operation 706, the menu module 306 generates a menu element that includes an identifier associated with the second client device 102. For example, the menu element may include a display of a map image, wherein an identifier associated with the second client device 102 is presented at a position within the map image based on a location of the second client device 102, as seen in the menu element 1025 depicted in the interface diagram 1000 of FIG. 10.

Figure 8:
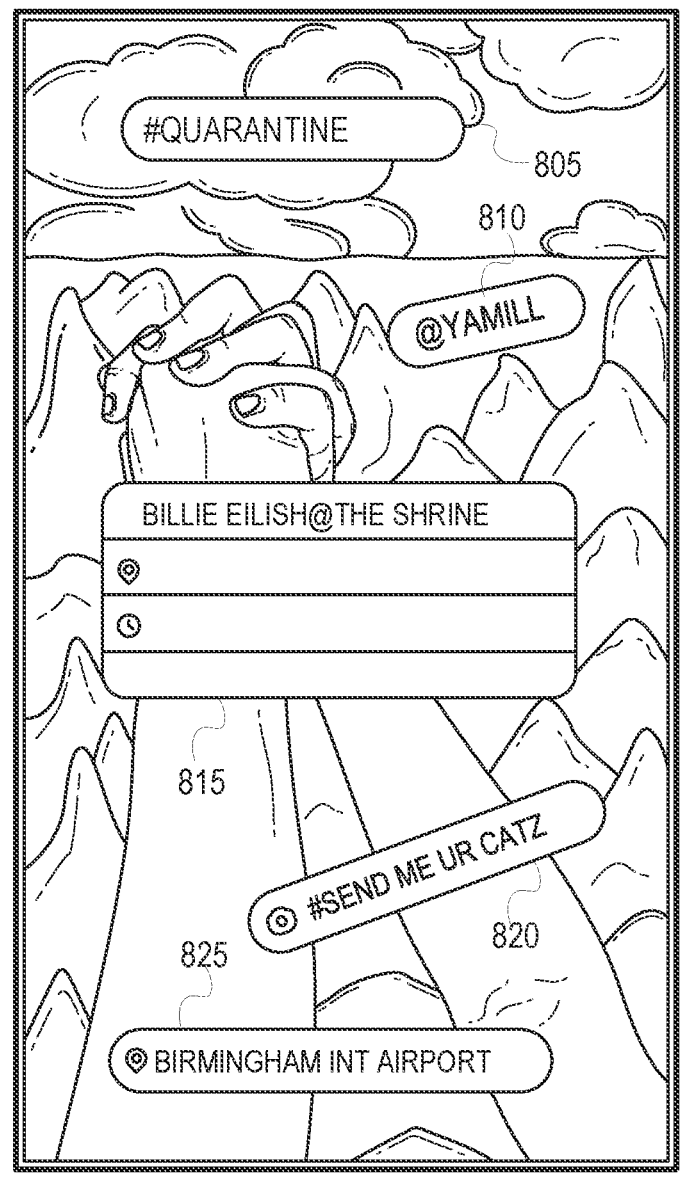
FIG. 8 is an interface diagram depicting a graphical user interface that includes a presentation of one or more interactive stickers, according to certain example embodiments.

FIG. 8 is an interface diagram 800 depicting a GUI that includes a presentation of one or more interactive stickers (805, 810, 815, 820, and 825), according to certain example embodiments.

As seen in the interface diagram 800, the interactive stickers may include a display of an identifier that identifies an account, a media category, or a location. For example, the interactive stickers 805 and 820 comprises a display of an identifier (i.e., #quarantine, #sendmeurcatz) which identifies a media category. Similarly, the interactive sticker 810 comprises a display of a user identifier that identifies a user account (i.e., @yamill).

The interactive stickers 815 and 825 comprise a display of identifiers that identify a location or event. For example, the interactive sticker 815 comprises a display of an event identifier (i.e., "Billie Eilish @the shrine), wherein the event identifier includes a location identifier and a time and date. The interactive sticker 825 comprises a display of an identifier that identifies a location of interest (i.e., Birmingham international airport).

FIG. 9 is an interface flow diagram 900 depicting interfaces presented by the interactive sticker system 124 at a client device 102, according to certain example embodiments. As seen in the diagram 900, an interface 905 may include a display of media (i.e., an image) that includes a presentation of an interactive sticker 915. According to certain example embodiments, the interactive sticker 915 may include a display of an identifier, such as a user identifier that references a user account.

According to certain embodiments, a user of a client device 102 may provide the input 920 that selects the interactive sticker 915. As discussed in the method 400, responsive to receiving the input that selects the interactive sticker 915, the interactive sticker system 124 may present the interface 910, wherein the interface 910 includes a display of a menu element 925, wherein one or more menu options of the menu element 925 are selected based on one or more of attributes of the input 920, user data associated with a user of the client device 102, as well as contextual factors that include a current location of the client device 102, and a time of day.

FIG. 10 is an interface flow diagram 1000 depicting interfaces presented by the interactive sticker system 124 at a client device 102, according to certain example embodiments. As seen in the diagram 1000, an interface 1005 may include a display of media (i.e., an image) that includes a presentation of an interactive sticker 1015. According to certain example embodiments, the interactive sticker 1015 may include a display of an identifier, such as an identifier that identifies a location of interest or an account associated with a business.

According to certain embodiments, a user of a client device 102 may provide the input 1020 that selects the interactive sticker 1015. As discussed in the method 400, responsive to receiving the input that selects the interactive sticker 1015, the interactive sticker system 124 may present the interface 1010, wherein the interface 1010 includes a display of a menu element 1025, wherein one or more menu options of the menu element 1025 are selected based on one or more of attributes of the input 1020, user data associated with a user of the client device 102, as well as contextual factors that include a current location of the client device 102, a time of day, and client devices that may be within a threshold distance of the location identified by the identifier from the interactive sticker 1015.

For example, as discussed in the method 700 described in FIG. 7, one or more user identifiers, such as the user identifier 1030, associated with client devices 102 which are within a threshold distance of the location associated with the interactive sticker 1015, or in some embodiments, within a threshold distance of the client device 102, may be presented within the menu element 1025.

Software Architecture

Figure 11:
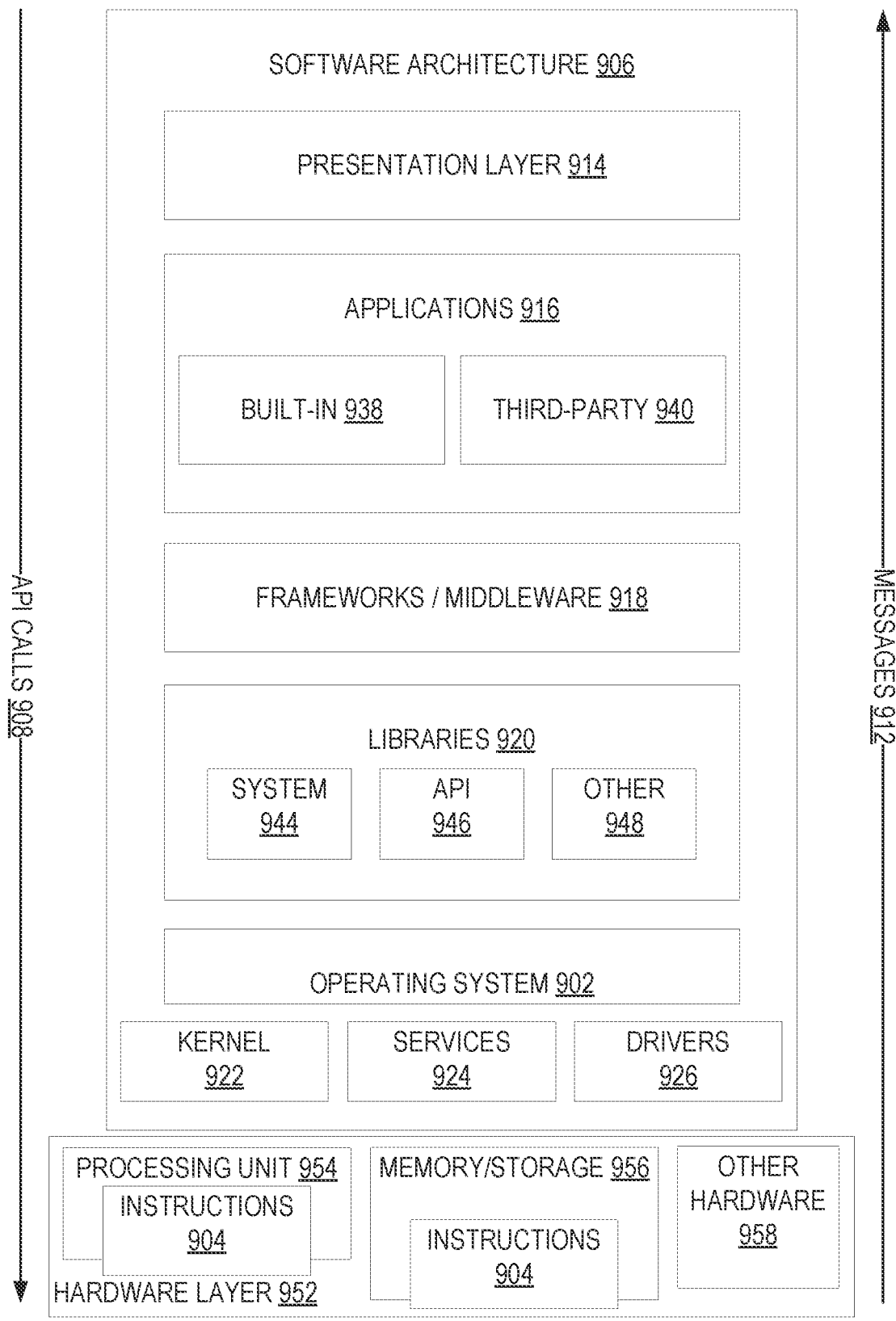
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1206 may execute on hardware such as machine 1200 of FIG. 12 that includes, among other things, processors 1204, memory 1214, and I/O components 1218. A representative hardware layer 1152 is illustrated and can represent, for example, the machine 1100 of FIG. 11.

The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 1 the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG-4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
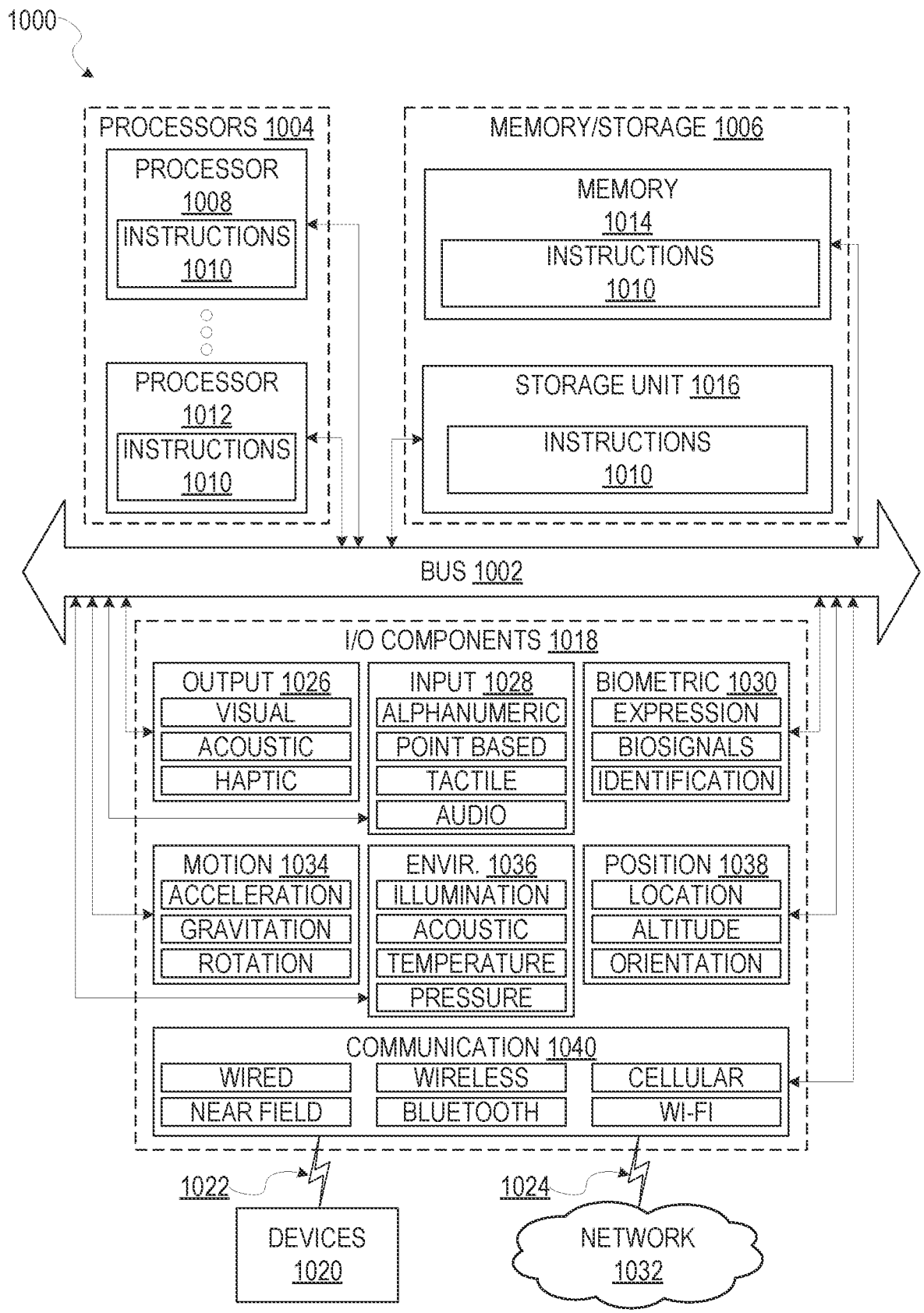
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (pc), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WIMAX), Long Term Evolution (LIE) standard, others defined by various standard setting organizations, other long range protocols, or other data transfer technology.

"EMPITEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner, in various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:
1. A method comprising:
   causing display of a presentation of media from within a collection of media content at a client device associated with a user account that comprises user profile data responsive to a request, the collection of media content associated with a social network connection of the user account, the presentation of the media including a display of an icon that corresponds with an event that comprises a location and a time;
   receiving an input that selects the icon from the client device, the input comprising an input attribute that includes an input duration;
   selecting a set of menu options from among a plurality of menu options based on the user profile data, the social network connection, and the input attribute that include the input duration of the input;
   causing display of a menu element that includes a display of the location and the time associated with the event, and the set of menu options that include an option to add the event to a calendar associated with a user profile associated with the client device;
   receiving a selection of the option to add the event to the calendar associated with the user profile; and
   adding the event to the calendar associated with the user profile based on the location and the time of the event responsive to the selection of the option.

2. The method of claim 1, wherein the menu element comprises a set of menu options, and wherein the selection of the menu element includes a selection of an option from among the set of menu options, and wherein the adding the event to the calendar associated with the user profile is based on the selection of the option.

3. The method of claim 1, wherein the media comprises image data.

4. The method of claim 1, wherein the causing display of the presentation of the media at the client device further comprises:
- receiving a message that includes the media at the client device; and
- causing display of the presentation of the media based on the message.

5. A system comprising:
- a memory; and
- at least one hardware processor coupled to the memory and comprising instructions that causes the system to perform operations comprising:
- causing display of a presentation of media from within a collection of media content at a client device associated with a user account that comprises user profile data responsive to a request, the collection of media content associated with a social network connection of the user account, the presentation of the media including a display of an icon that corresponds with an event that comprises a location and a time;
- receiving an input that selects the icon from the client device, the input comprising an input attribute that includes an input duration;
- selecting a set of menu options from among a plurality of menu options based on the user profile data, the social network connection, and the input attribute that include the input duration of the input;
- causing display of a menu element that includes a display of the location and the time associated with the event, and the set of menu options that include an option to add the event to a calendar associated with a user profile associated with the client device;
- receiving a selection of the option to add the event to the calendar associated with the user profile; and
- adding the event to the calendar associated with the user profile based on the location and the time of the event responsive to the selection of the option.

6. The system of claim 5, wherein the menu element comprises a set of menu options, and wherein the selection of the menu element includes a selection of an option from among the set of menu options, and wherein the adding the event to the calendar associated with the user profile is based on the selection of the option.

7. The system of claim 5, wherein the media comprises image data.

8. The system of claim 5, wherein the causing display of the presentation of the media at the client device further comprises:
- receiving a message that includes the media at the client device; and
- causing display of the presentation of the media based on the message.

9. A non-transitory machine-readable storage medium comprising instructions that, when executed by one or more processors of a machine, cause the machine to perform operations comprising:
- causing display of a presentation of media from within a collection of media content at a client device associated with a user account that comprises user profile data responsive to a request, the collection of media content associated with a social network connection of the user account, the presentation of the media including a display of an icon that corresponds with an event that comprises a location and a time;
- receiving an input that selects the icon from the client device, the input comprising an input attribute that includes an input duration;
- selecting a set of menu options from among a plurality of menu options based on the user profile data, the social network connection, and the input attribute that include the input duration of the input;
- causing display of a menu element that includes a display of the location and the time associated with the event, and the set of menu options that include an option to add the event to a calendar associated with a user profile associated with the client device;
- receiving a selection of the option to add the event to the calendar associated with the user profile; and
- adding the event to the calendar associated with the user profile based on the location and the time of the event responsive to the selection of the option.

10. The non-transitory machine-readable storage medium of claim 9, wherein the menu element comprises a set of menu options, and wherein the selection of the menu element includes a selection of an option from among the set of menu options, and wherein the adding the event to the calendar associated with the user profile is based on the selection of the option.

11. The non-transitory machine-readable storage medium of claim 9, wherein the media comprises image data.

\* \* \* \* \*